US009057883B2

(12) United States Patent
Yasuda

(10) Patent No.: US 9,057,883 B2
(45) Date of Patent: Jun. 16, 2015

(54) IMAGE SHAKE CORRECTING DEVICE, LENS BARREL, OPTICAL APPARATUS, AND IMAGE PICKUP APPARATUS

(71) Applicant: CANON KABUSHIKI KAISHA, Tokyo (JP)

(72) Inventor: Hiromu Yasuda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/306,448

(22) Filed: Jun. 17, 2014

(65) Prior Publication Data

US 2015/0010296 A1 Jan. 8, 2015

(30) Foreign Application Priority Data

Jul. 4, 2013 (JP) .................................. 2013-140730

(51) Int. Cl.
*G03B 17/00* (2006.01)
*G02B 27/64* (2006.01)
(52) U.S. Cl.
CPC .................... *G02B 27/646* (2013.01)
(58) Field of Classification Search
CPC ....................................................... G03B 5/00
USPC .......................................................... 396/55
See application file for complete search history.

(56) References Cited

U.S. PATENT DOCUMENTS

| 7,154,199 B2 | 12/2006 | Yasuda |
| 7,783,179 B2 * | 8/2010 | Takahashi ....................... 396/55 |
| 8,442,392 B2 * | 5/2013 | Ollila et al. ..................... 396/55 |
| 2014/0160566 A1 * | 6/2014 | Shihoh .......................... 359/557 |

FOREIGN PATENT DOCUMENTS

JP 2008-134329 A 6/2008

* cited by examiner

*Primary Examiner* — Clayton E Laballe
*Assistant Examiner* — Dennis Hancock
(74) *Attorney, Agent, or Firm* — Fitzpatrick, Cella, Harper & Scinto

(57) ABSTRACT

An image shake correcting device includes a movable unit for holding a correction lens, a rotation preventing plate that rotatably supports the movable unit about a first rotation axis orthogonal to the optical axis, and a fixed base plate that rotatably supports the rotation preventing plate about a second rotation axis orthogonal to the optical axis. The first rotation axis and the second rotation axis intersect at point O on the optical axis of the correction lens. An urging spring urges in a direction where both the movable unit and the fixed base plate are brought closer to each other. A first rolling ball is located on a first hypothetical spherical surface formed between the movable unit and the rotation preventing plate, and a second rolling ball is located on a second hypothetical spherical surface formed between the rotation preventing plate and the fixed base plate.

17 Claims, 12 Drawing Sheets

IMAGE SHAKE CORRECTING DEVICE, LENS BARREL, OPTICAL APPARATUS, AND IMAGE PICKUP APPARATUS

BACKGROUND OF THE INVENTION

1. Field of the Invention

The present invention relates to an image shake correcting device mounted in an image pickup apparatus or the like.

2. Description of the Related Art

An image shake correcting device mitigates the effects of hand shaking in capturing images by driving a movable barrel for holding an optical member or an imaging element in two directions (the yaw direction and the pitch direction) within a plane perpendicular to the optical axis. Japanese Patent Laid-Open No. 2008-134329 discloses an image shake correcting device that drives a movable barrel for holding a correction lens in two directions on a spherical surface of which the spherical center is defined by a predetermined point so as to prevent a reduction in optical performance upon movement of a correction lens.

Japanese Patent Laid-Open No. 2008-134329 discloses a device that movably supports a holding frame for holding a first lens with respect to a supporting frame via three spheres. In other words, the degree of freedom is three in the configuration because three points are restricted, so that the holding frame is rotatable with respect to the supporting frame not only in the yaw direction and the pitch direction but also in the direction (roll direction) about the optical axis. The holding frame is driven by two actuators which generate a driving force in the yaw direction and the pitch direction. Thus, when the holding frame rotates about the optical axis, the position of the first lens cannot be controlled with high accuracy.

SUMMARY OF THE INVENTION

The present invention provides an image shake correcting device that is capable of driving a movable member in two directions substantially perpendicular to the optical axis so as to suppress rotation of the movable member about the optical axis.

According to an aspect of the present invention, an image shake correcting device that corrects image shake by causing a drive unit to move a movable member for holding a correction member is provided that includes a rotation preventing member configured to rotatably support the movable member about a first rotation axis orthogonal to the optical axis of the correction member; and a fixing member configured to rotatably support the rotation preventing member about a second rotation axis which is orthogonal to the optical axis of the correction member and intersects the first rotation axis at a point on the optical axis.

According to the present invention, an image shake correcting device that is capable of driving a movable member in two directions substantially perpendicular to the optical axis so as to suppress rotation of the movable member about the optical axis may be provided.

Further features of the present invention will become apparent from the following description of exemplary embodiments with reference to the attached drawings.

DESCRIPTION OF THE EMBODIMENTS

Hereinafter, preferred embodiments of the present invention will be described with reference to the drawings. In the following embodiments, a description will be given by taking an example in which the present invention is applied to an image shake correcting device mounted in an image pickup apparatus or optical apparatus. The present invention is applicable to, for example, an image pickup apparatus such as a digital video camera, a monitoring camera, a Web camera, or the like and electronic equipment including an image pickup apparatus, such as a mobile phone, a tablet terminal, or the like. The present invention is also applicable to an interchangeable lens attached to a digital single lens reflex camera and optical apparatus like an observation apparatus such as a binocular, a telescope, or a field scope.

First Embodiment

Figure 1:
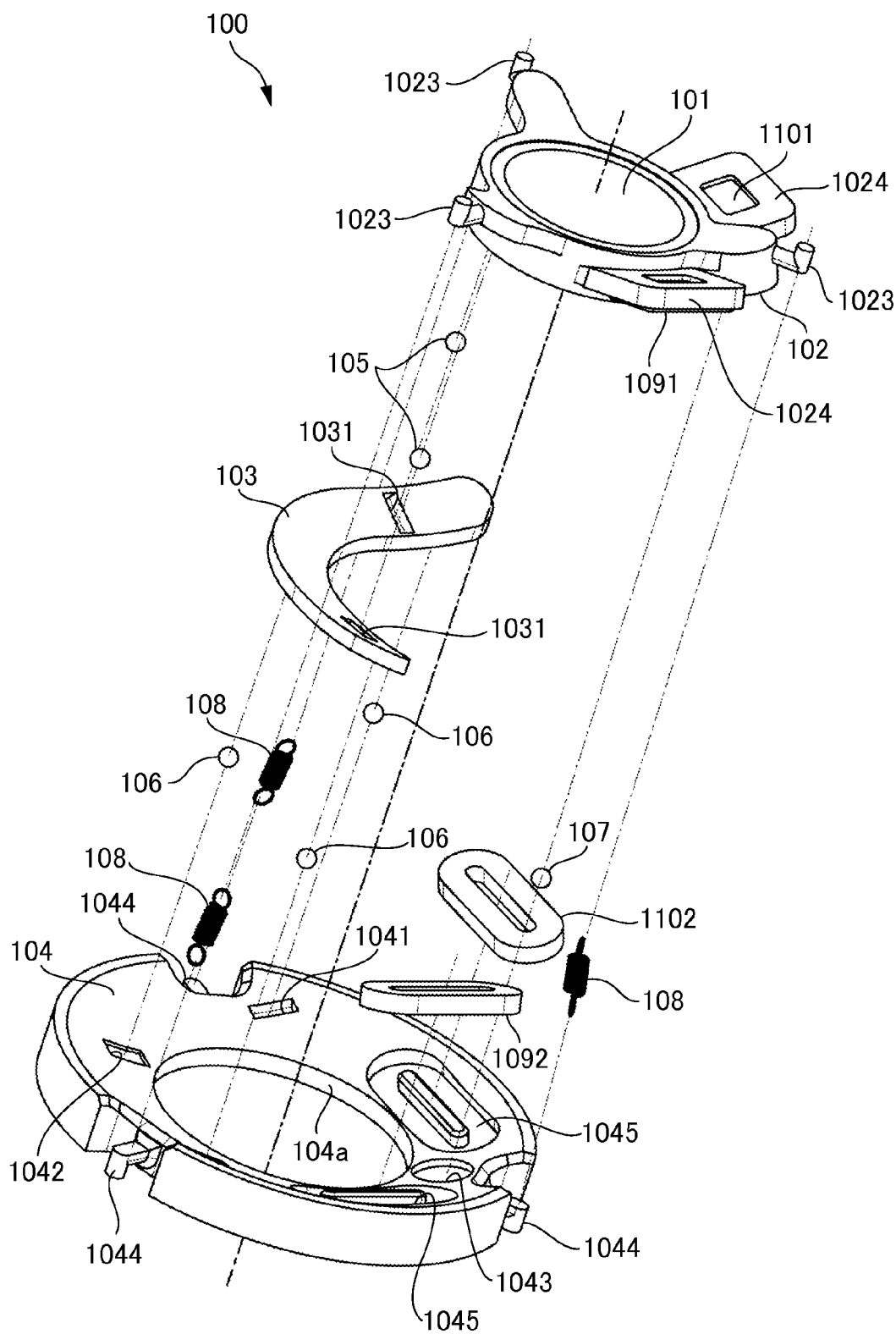
FIG. 1 is an exploded perspective view illustrating an image shake correcting device according to a first embodiment of the present invention.
Figure 2:
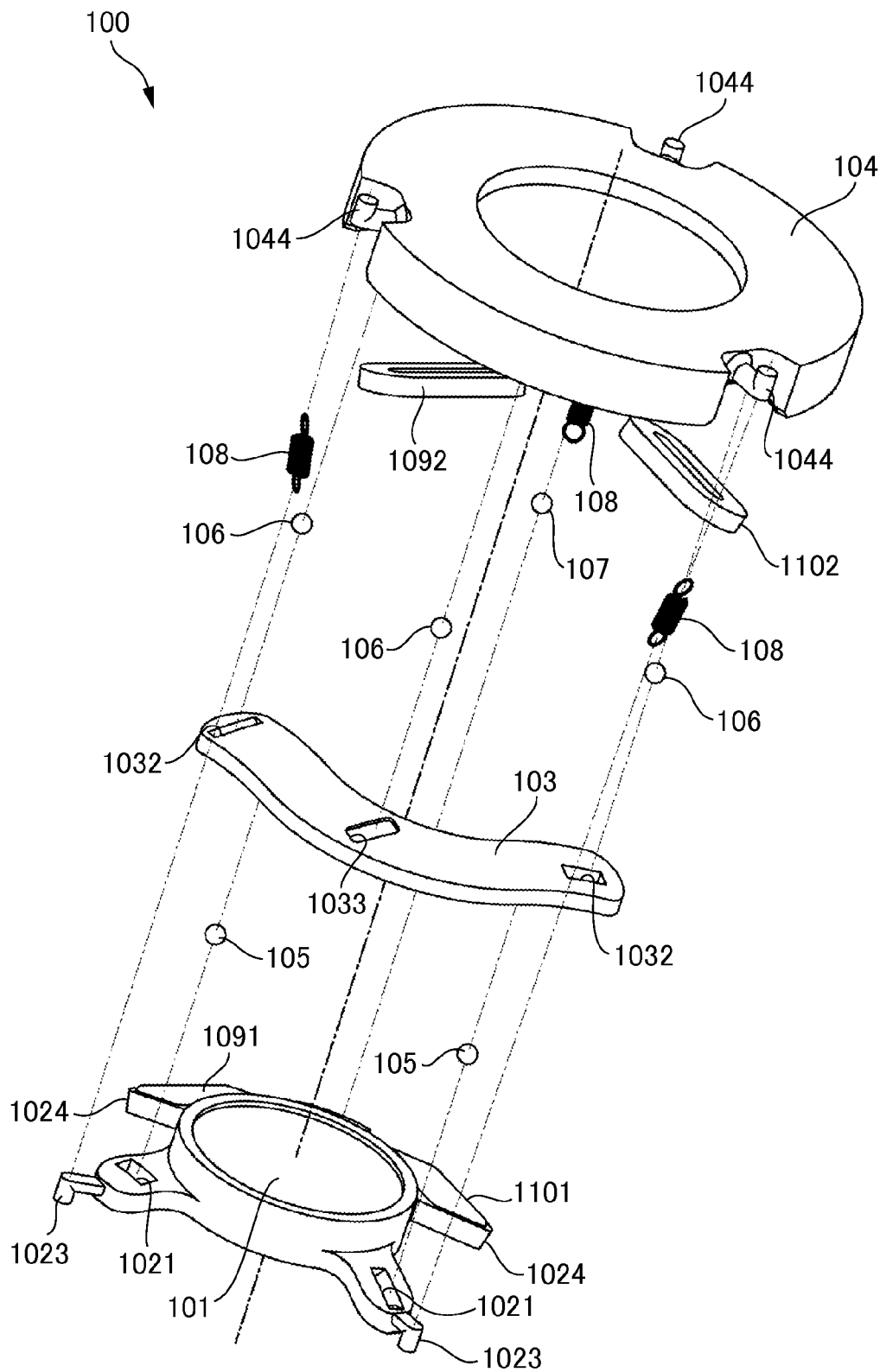
FIG. 2 is an exploded perspective view illustrating an image shake correcting device as viewed from the opposite side from which the image shake correcting device is viewed in FIG. 1.

A description will be given of an image shake correcting device 100 according to a first embodiment of the present invention with reference to FIGS. 1 to 7. FIG. 1 is an exploded perspective view illustrating a configuration of the image shake correcting device 100. FIG. 2 is an exploded perspective view illustrating the image shake correcting device 100 as viewed from the opposite side from which the image shake correcting device 100 is viewed in FIG. 1. The image shake correcting device 100 includes a movable unit 102 for holding a correction lens 101, a rotation preventing plate 103, and a fixed base plate 104. The image shake correcting device 100 further includes a first rolling ball 105, a second rolling ball 106, a third rolling ball 107, and an urging spring 108. A first drive unit 109 and a second drive unit 110 are electromagnetic drive units. The first drive unit 109 has a first magnet 1091 and a first coil 1092. The second drive unit 110 has a second magnet 1101 and a second coil 1102.

Figure 3:
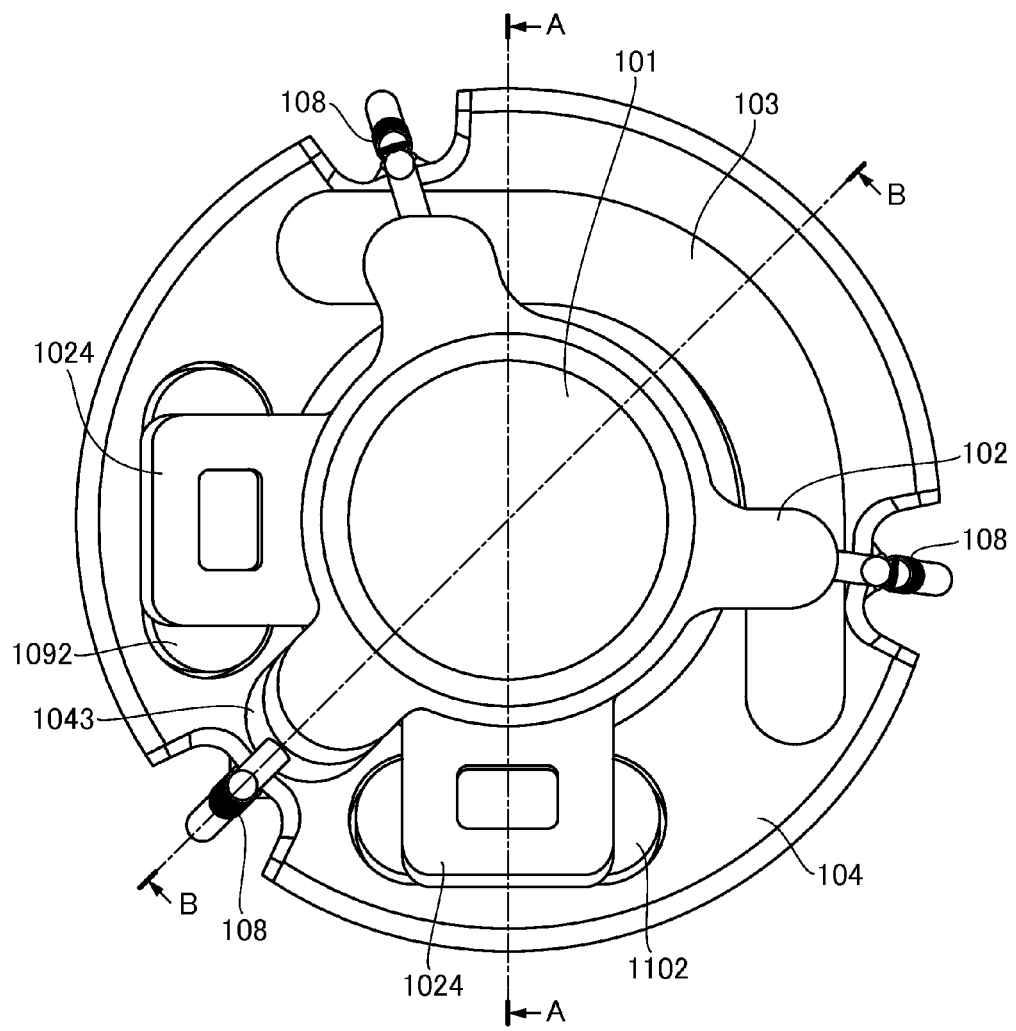
FIG. 3 is a front view illustrating an assembled image shake correcting device.
Figure 4:
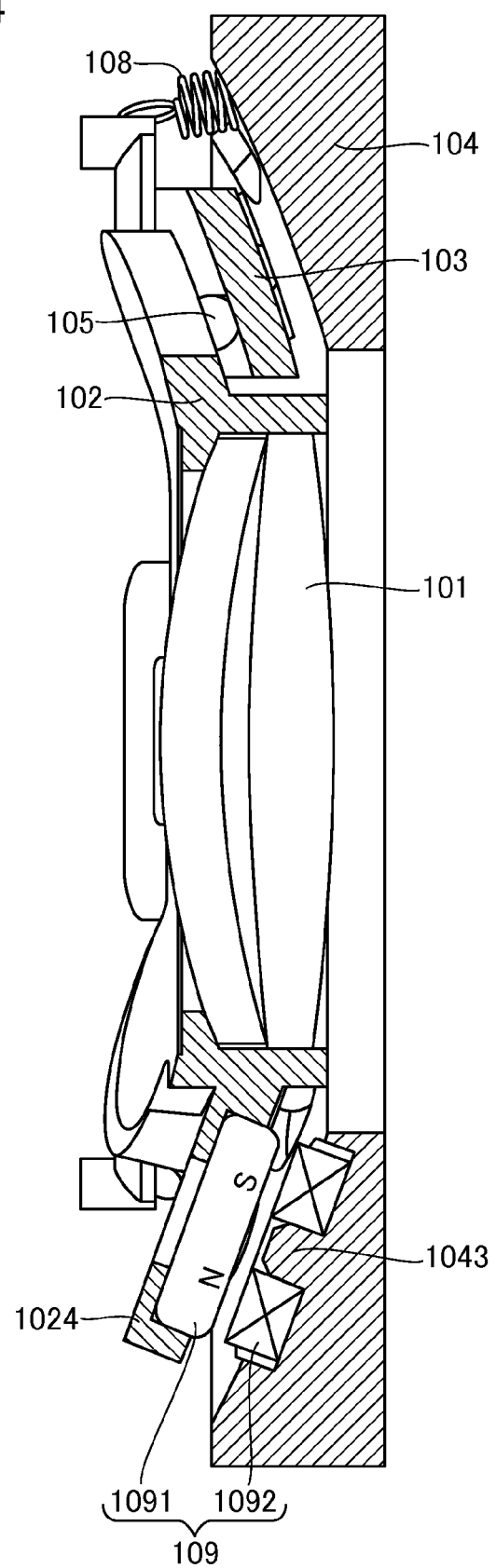
FIG. 4 is a cross-sectional view illustrating the image shake correcting device shown in FIG. 3 cut along the A-A line.
Figure 5:
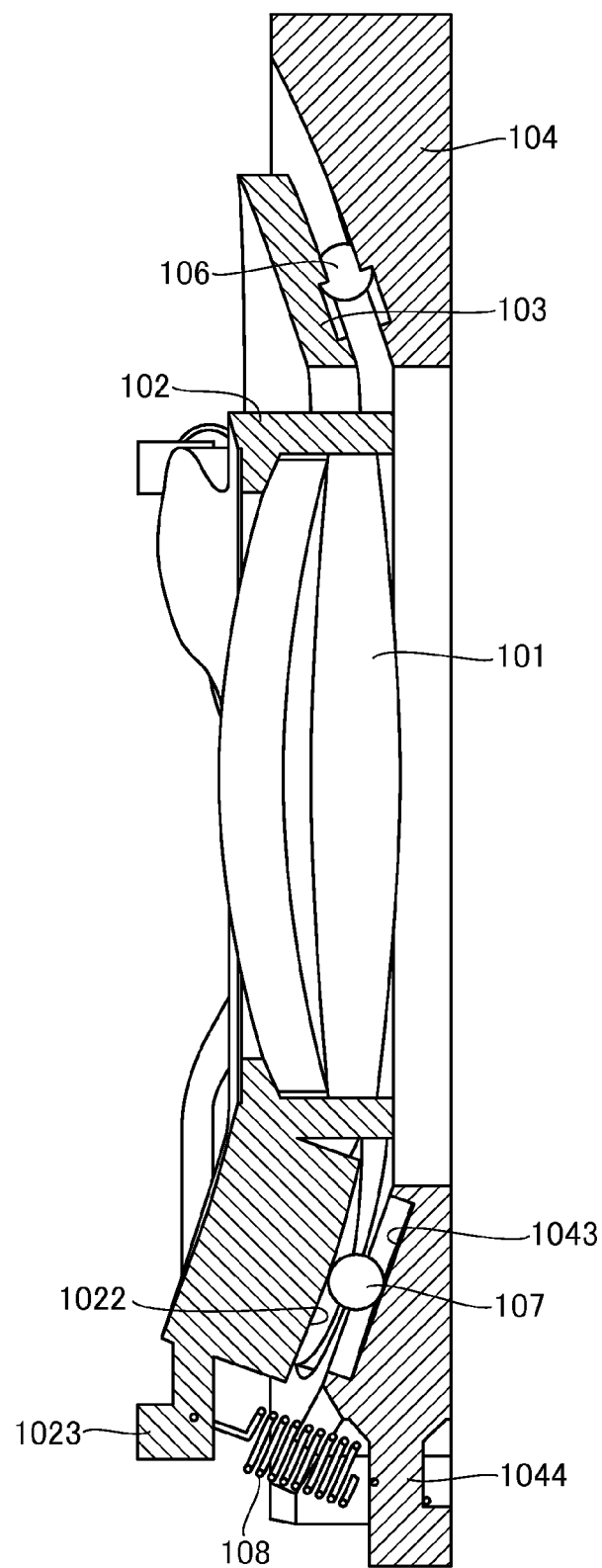
FIG. 5 is a cross-sectional view illustrating the image shake correcting device shown in FIG. 3 cut along the B-B line.
Figure 6:
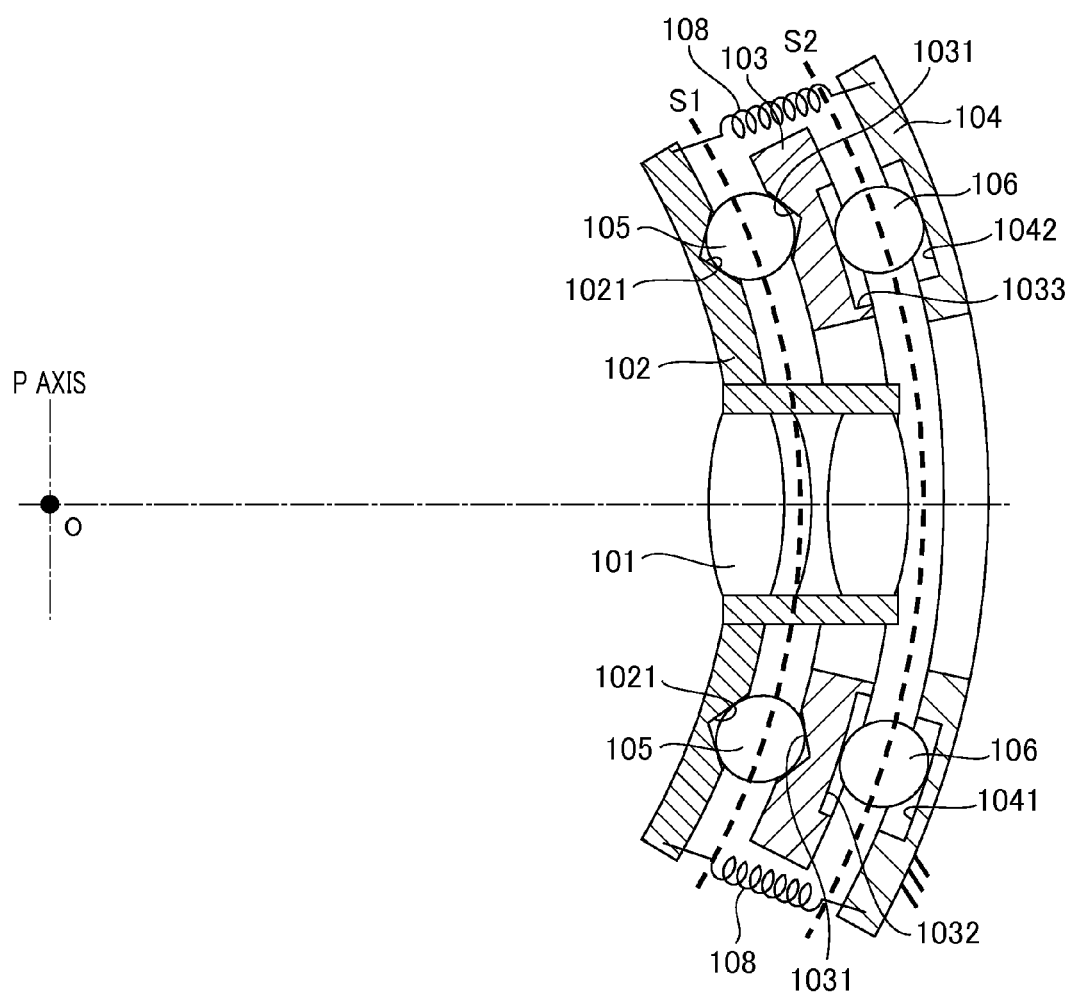
FIG. 6 is a schematic view illustrating a cross-sectional structure which passes through the optical axis and is orthogonal to the yaw rotation axis.
Figure 7:
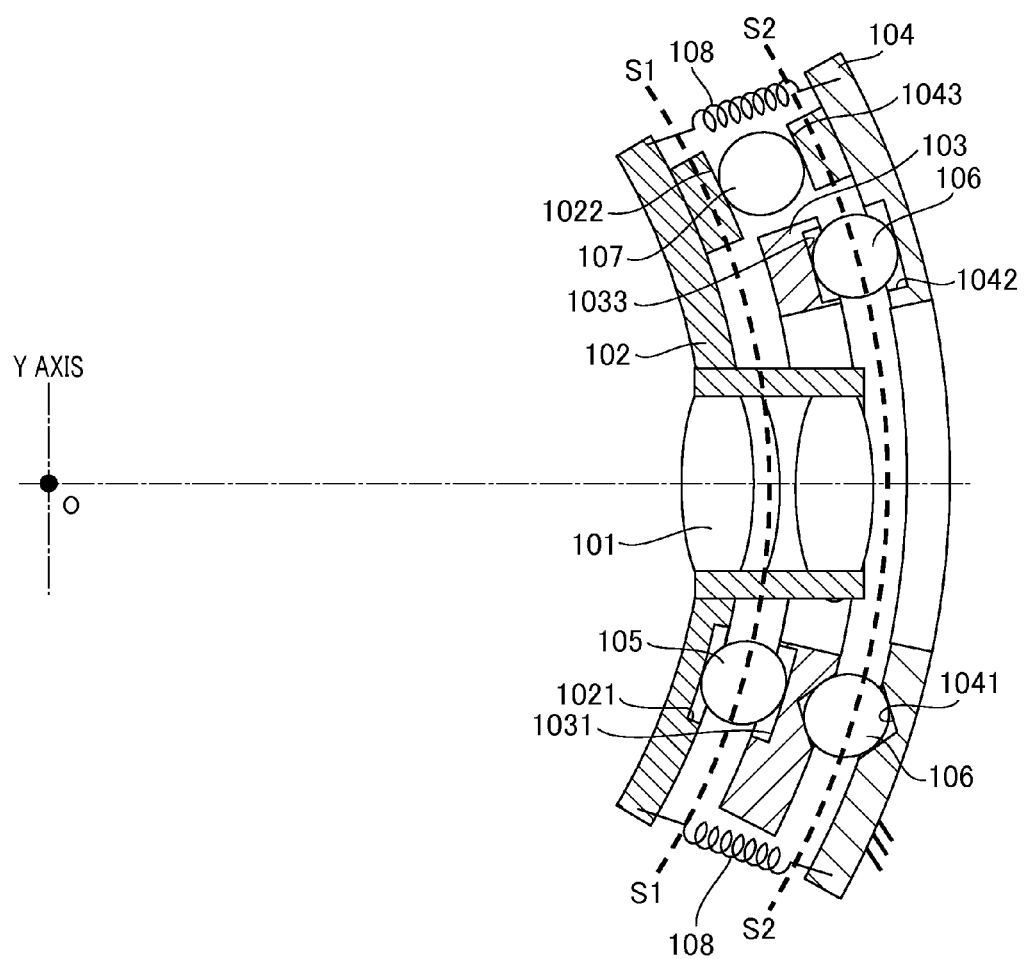
FIG. 7 is a schematic view illustrating a cross-sectional structure which passes through the optical axis and is orthogonal to the pitch rotation axis.

FIG. 3 is a front view illustrating the image shake correcting device 100 in an assembled state as viewed from the optical axis direction. FIG. 4 is a cross-sectional view illustrating the image shake correcting device 100 when cut along a plane (the cross section A-A in FIG. 3) parallel to the optical axis. FIG. 5 is a cross-sectional view illustrating the image shake correcting device 100 when cut along a plane along the B-B line shown in FIG. 3. FIG. 6 is a schematic view illustrating a cross-sectional structure when cut along a plane which passes through the optical axis and is orthogonal to the yaw rotation axis. FIG. 6 shows the same cross section as FIG. 4, but the first and second drive units are omitted in order to explain the structure of the image shake correcting device 100. The positions of the first to third rolling balls are appropriately changed such that the center points thereof are located on the cross section. FIG. 7 is a schematic view illustrating a cross-sectional structure when cut along a plane which passes through the optical axis and is orthogonal to the pitch rotation axis. The same modification as FIG. 6 is made in FIG. 7. In FIGS. 6 and 7, a part of the shape of the image shake correcting device 100 is exaggeratedly shown.

The correction lens 101 is a correction member that moves along the spherical surface of which the spherical center is defined by the rotation center point (hereinafter referred to as "point O") on the optical axis. The correction lens 101 constitutes a part of an imaging optical system (not shown), and moves an image obtained by the imaging optical system within a plane perpendicular to the optical axis. In this manner, the stability on an image plane can be ensured upon detecting hand shaking or the like. Note that the present invention is applicable not only to an embodiment in which a correction lens is used as a correction member but also to an embodiment in which an imaging element, a prism, or the like is driven as a correction member.

Here, a phantom line which passes through the rotation center point O and is perpendicular to the optical axis of the imaging optical system is defined as the pitch rotation axis (indicated by the P axis in FIG. 6). A phantom line which passes through the rotation center point O and is perpendicular to both the optical axis and the pitch rotation axis P is defined as the yaw rotation axis (indicated by the Y axis in FIG. 7). The pitch rotation axis P is the first rotation axis regarding the image shake correcting device, and the yaw rotation axis Y is the second rotation axis. The surface toward which the rotation center point O is located as viewed from the correction lens 101 is defined as the front surface, and the surface at the side opposite the front surface is defined as the back surface.

The movable unit 102 is a movable member that holds the correction lens 101 at the central opening. The movable unit 102 has two movable-side first ball receivers 1021 on the back surface thereof (see FIG. 2). The movable unit 102 also has one movable-side third ball receiver 1022 on the back surface thereof (see FIG. 5). The movable unit 102 has three spring hooks 1023 and two magnet holders 1024.

The movable-side first ball receiver 1021 has a groove of which the cross-sectional shape is a V-shape. The shape of the groove is defined by two rotary surfaces (the front surface of the rotary body) having the pitch rotation axis P as a center axis. The movable-side first ball receiver 1021 is brought into contact with the first rolling ball 105 at two points. In the present embodiment, the shape of the groove is defined as two conical surfaces having the pitch rotation axis P as a center axis, but may also be defined as two spherical surfaces having two different center points on the pitch rotation axis P or as a torus surface. The movable-side third ball receiver 1022 is formed into a spherical surface having a spherical center which is coincident with the rotation center point O and is brought into contact with the third rolling ball 107 at a single point.

The spring hook 1023 is positioned at three locations around the optical axis. One ends of three urging springs 108 are caught on three spring hooks 1023, respectively, so that the urging springs 108 are held thereby. Two magnet holders 1024 are disposed on the outer periphery of the movable unit 102 with an angle of 90 degrees around the optical axis, and hold first and second magnets to be described below.

The rotation preventing plate 103 is a thin-plate rotation preventing member of which the projection shape as viewed from the front in the optical axis direction is an edgeless substantial L-shape as shown in FIG. 3. The reason why the rotation preventing member is formed into such a shape is not to prevent the optical path of the correction lens 101. As shown in FIGS. 4 and 5, each of the front and back surfaces of the rotation preventing plate 103 is formed into a spherical surface having a spherical center which is coincident with the rotation center point O. The rotation preventing plate 103 has two first ball receivers 1031 on the front surface thereof. The rotation preventing plate 103 also has two V-shaped second ball receivers 1032 and one plane second ball receiver 1033 on the back surface thereof (see FIG. 2).

The first ball receiver 1031 has a groove of which the cross-sectional shape is a V-shape. The shape of the groove is defined by the rotary surface having the pitch rotation axis P as a center axis. In the present embodiment, the shape of the groove is defined as two conical surfaces having the pitch rotation axis P as a center axis. The first ball receiver 1031 is positioned opposite to the movable-side first ball receiver 1021 and is brought into contact with the first rolling ball 105 at two points.

The V-shaped second ball receiver 1032 has a groove of which the cross-sectional shape is a V-shape. The shape of the groove is defined by the rotary surface having the yaw rotation axis Y as a center axis. In the present embodiment, the shape of the groove is defined as two conical surfaces having the yaw rotation axis Y as a center axis. The V-shaped second ball receiver 1032 is brought into contact with the second rolling ball 106 at two points. The plane second ball receiver 1033 has a groove of which the bottom surface is a cylindrical surface having the yaw rotation axis Y as a center axis and is brought into contact with the second rolling ball 106 at a single point.

The fixed base plate 104 has a substantial disk shape and is fixed to a lens barrel for supporting another lens group (not shown). A central opening 104*a* is used as the optical path of the correction lens 101. The front surface side of the fixed base plate 104 is formed into a spherical surface having a spherical center which is coincident with the rotation center point O. The fixed base plate 104 includes fixed-side ball receivers provided at plural locations on the front surface thereof. Each of two V-shaped second ball receivers 1041 has a groove of which the cross-sectional shape is a V-shape. The shape of the groove is defined by two rotary surfaces having the yaw rotation axis Y as a center axis. In the present embodiment, the shape of the groove is defined as two conical surfaces having the yaw rotation axis Y as a center axis. Each of two V-shaped second ball receivers 1041 is positioned opposite to the V-shaped second ball receiver 1032 of the rotation preventing plate 103 and is brought into contact with the second rolling ball 106 at two points.

A plane second ball receiver 1042 disposed on the fixed base plate 104 has a groove of which the bottom surface is a cylindrical surface having the yaw rotation axis Y as a center axis. The plane second ball receiver 1042 is positioned opposite to the plane second ball receiver 1033 of the rotation preventing plate 103 and is brought into contact with the second rolling ball 106 at a single point. A third ball receiver 1043 disposed on the fixed base plate 104 is formed into a spherical surface having a spherical center which is coincident with the rotation center point O. The third ball receiver 1043 is positioned opposite to the movable-side third ball receiver 1022 and is brought into contact with the third rolling ball 107 at a single point.

The fixed base plate 104 includes three spring hooks 1044 disposed on the outer periphery thereof around the optical axis. One ends of three urging springs 108 are caught on three spring hooks 1044, respectively, so that the urging springs 108 are held thereby. Two coil holders 1045 are disposed on the front surface side of the fixed base plate 104 with an angle of 90 degrees in a direction around the optical axis, and hold first and second coils to be described below.

The shape of each of the first rolling ball 105, the second rolling ball 106, and the third rolling ball 107 is sphere. The first rolling member consists of two first rolling balls 105 which are positioned such that the distance between the center point thereof and the rotation center point O is equal to R1. Hereinafter, a spherical surface of which the radius is R1 and the spherical center is coincident with the rotation center point O is referred to as a "first hypothetical spherical surface" and is denoted by "S1" in FIGS. 6 and 7. The second rolling member consists of three second rolling balls 106 which are positioned such that the distance between the center point thereof and the rotation center point O is equal to R2. Hereinafter, a spherical surface of which the radius is R2 and the spherical center is coincident with the rotation center point O is referred to as a "second hypothetical spherical surface" and is denoted by "S2" in FIGS. 6 and 7. In the present embodiment, the radius R2 is greater than the radius R1. The third rolling member consists of one third rolling ball 107.

The urging spring 108 is an urging member that is disposed between the movable unit 102 and the fixed base plate 104 and has an urging force in a tensile direction. In the present embodiment, three urging springs 108 are disposed at equal intervals in the circumferential direction. With the aid of these urging springs 108, a tensile force also occurs in the radial direction about the optical axis of the correction lens 101.

The electromagnetic drive unit has the first drive unit 109 and the second drive unit 110. Each drive unit includes a magnet (permanent magnet) and a coil (electromagnetic coil). The first drive unit 109 is a voice coil motor. The first magnet 1091 is in a rectangular shape and is attached to one of the magnet holders 1024 of the movable unit 102. The surface on which the first magnet 1091 faces the first coil 1092 is divided along a center line into two portions which are magnetized to the N-pole and the S-pole such that the direction of the normal to opposite surfaces is the magnetic pole direction. The surface on the opposite side of the surface on which the first magnet 1091 faces the first coil 1092 may be magnetized a pole of opposite polarity to the surface facing the first coil 1092 or may not be magnetized when the thickness of the magnet is sufficiently thick. The first coil 1092 is a winding coil formed into an oval shape and is attached to one of the coil holders 1045 of the fixed base plate 104. One surface of the first coil 1092 faces the magnetized surface of the first magnet 1091. When the driving control unit (not shown) energizes the first coil 1092, the Lorentz force is generated in a direction orthogonal to the magnetizing direction and the conducting direction of the first magnet 1091. In this manner, the pitch directional driving force is exerted between the fixed base plate 104 and the movable unit 102.

The second drive unit 110 is a voice coil motor. The second drive unit 110 is the same configuration as that of the first drive unit 109 except that the second drive unit 110 is positioned with an angle of 90 degrees around the optical axis with respect to the first drive unit 109, and thus, a detailed description thereof will be omitted. When the driving control unit energizes the second coil 1102, the Lorentz force is generated in a direction orthogonal to the magnetizing direction of the second magnet 1101 and the conducting direction. In this manner, the yaw directional driving force is exerted between the fixed base plate 104 and the movable unit 102.

Since the first drive unit 109 and the second drive unit 110 are positioned on the outer periphery of the correction lens 101 (positioned away from the optical axis), the radially inner portion of the movable unit 102 may be used as the optical path of the correction lens 101. Since the type of the drive unit is not limited, any drive principle may be used provided that a predetermined driving force is exerted in the pitch direction and the yaw direction. In addition to the voice coil motor used in the present embodiment, a drive unit such as a stepping motor, an ultrasonic motor, a motor using an electrostatic force, a bimorph, or the like may also be employed.

Next, a description will be given of the structure of the image shake correcting device 100 and the relationship among the elements of the image shake correcting device 100. Firstly, a description will be given of positioning of the correction lens 101 in the optical axis direction. The first rolling ball 105 is held between the movable-side first ball receiver 1021 disposed on the movable unit 102 and the first ball receiver 1031 disposed on the rotation preventing plate 103. The second rolling ball 106 is held between the second ball receivers 1032 and 1033 disposed on the rotation preventing plate 103 and the fixed-side ball receivers 1041 and 1042 disposed on the fixed base plate 104. The third rolling ball 107 is held between the movable-side third ball receiver 1022 disposed on the movable unit 102 and the fixed-side third ball receiver 1043 disposed on the fixed base plate 104.

The urging spring 108 urges the movable unit 102 with respect to the fixed base plate 104 in the optical axis direction. In this manner, an urging force is applied to each rolling ball at the contact surfaces of the ball receiving surfaces of the members between which the ball is held. The urging force allows to stably determine the position of each rolling ball in the optical axis direction. The rotation preventing plate 103 is supported by three second rolling balls 106 so that the position of the rotation preventing plate 103 in the optical axis direction is determined. The movable unit 102 is supported by two first rolling balls 105 and one third rolling ball 107 so that the position of the movable unit 102 in the optical axis direction is determined.

Next, a description will be given of the operation of the image shake correcting device 100. The rotation preventing plate 103 is movable with respect to the fixed base plate 104 only in the yaw direction. Each of two second rolling balls 106 rolls while being brought into contact with the V-shaped second ball receiver 1042 disposed on the fixed base plate 104, i.e., the ball receiving surface consisting of two conical surfaces having the yaw rotation axis Y as a center axis at two points. Thus, the second rolling ball 106 is only rollable in the rotational direction about the yaw rotation axis Y so that movement of the second rolling ball 106 in the rotational direction about the pitch rotation axis P is restricted. Also, each of two second rolling balls 106 rolls while being brought into contact with the V-shaped second ball receiver 1032 disposed on the rotation preventing plate 103, i.e., the ball receiving surface consisting of two conical surfaces having the yaw rotation axis Y as a center axis at two points. Thus, the second rolling ball 106 is rollable with respect to the rotation preventing plate 103 only in the rotational direction about the yaw rotation axis Y so that movement of the second rolling ball 106 in the rotational direction about the pitch rotation axis P is restricted. Consequently, the rotation preventing plate 103 is supported so as to be movable with respect to the fixed base plate 104 only in the yaw direction.

On the other hand, the movable unit 102 is movable with respect to the rotation preventing plate 103 only in the pitch direction. Each of the two first rolling balls 105 rolls while being brought into contact with the first ball receiver 1031 disposed on the rotation preventing plate 103, i.e., the ball receiving surface consisting of two conical surfaces having the pitch rotation axis P as a center axis at two points. Thus, the first rolling ball 105 is only rollable in the rotational direction about the pitch rotation axis P so that movement of the first rolling ball 105 in the rotational direction about the yaw rotation axis Y is restricted. Each of the two first rolling balls 105 rolls while being brought into contact with the movable-side first ball receiver 1021 provided on the movable unit 102, i.e., the ball receiving surface consisting of two conical surfaces having the pitch rotation axis P as a center axis at two points. Thus, the first rolling ball 105 is rollable with respect to the movable unit 102 only in the rotational direction about the pitch rotation axis P so that movement of the first rolling ball 105 in the rotational direction about the yaw rotation axis Y is restricted. Consequently, the movable unit 102 is supported so as to be movable with respect to the rotation preventing plate 103 only in the pitch direction.

When the driving control unit energizes the first coil 1092 so as to pass a predetermined current therethrough, a pitch directional driving force is generated between the fixed base plate 104 and the movable unit 102 due to the action of the first drive unit 109. Consequently, the movable unit 102 for holding the correction lens 101 moves in the rotational direction having the pitch rotation axis P as a center axis. On the other hand, when the driving control unit energizes the second coil 1102 so as to pass a predetermined current therethrough, a yaw directional driving force is generated between the fixed base plate 104 and the movable unit 102 due to the action of the second drive unit 110.
Consequently, the movable unit 102, the first rolling ball 105, and the rotation preventing plate 103 move in the yaw direction. These two movements are combined, so that the center point of the correction lens 101 can be moved at any position on the spherical surface of which the spherical center is coincident with the rotation center point O. Since the yaw rotation axis Y and the pitch rotation axis P are positioned to intersect each other at the rotation center point O, the radius of curvature of the movement of the correction lens 101 about the yaw rotation axis Y is equal to that of the movement of the correction lens 101 about the pitch rotation axis P. In this manner, the unevenness of change in optical performance upon movement of the correction lens 101 due to the movement direction of the movable unit 102 is reduced. Although movement to any position on the spherical surface can be controlled even in the case where the yaw rotation axis Y and the pitch rotation axis P are not orthogonal to each other, two movement directions can be independently controlled by making two axes orthogonal to each other as in the present embodiment, resulting in a better controllability.

Feedback control may also be performed by feeding back detection information obtained by a position sensor for detecting the position of the correction lens 101 to the driving control unit. In this manner, the positioning accuracy of the correction lens 101 can be improved. In the present embodiment, each of the movable unit 102 constituting the movable unit and the rotation preventing plate 103 is rolling supported by a plurality of rolling members. The movable unit can be supported by a low-friction mechanism, which is advantageous for improving accuracy and efficiency.

According to the present embodiment, the following effects are obtained.

Rotation of the movable unit 102 about the optical axis is suppressed.

In the conventional image shake correcting device, the movable unit has three degrees of freedom with respect to the fixing member. In other words, the movable unit has been rotatable about the pitch axis, rotatable about the yaw axis, and rotatable about the optical axis passing through the rotation center point O. In the conventional image shake correcting device, rotation of the movable unit about the optical axis has been suppressed by using a method for positioning the movable unit such that a driving force of the actuator passes through the center of mass. However, when the movable unit rotates about the optical axis due to impact or the like from an external force, the position of the correction lens cannot be precisely detected, which may cause a trouble with precise image shake correcting control.

In contrast, in the image shake correcting device according to the present embodiment, the rotation preventing plate 103 is supported so as to be rotationally movable with respect to the fixed base plate 104 only about the yaw rotation axis Y. The movable unit 102 is also supported so as to be rotationally movable with respect to the rotation preventing plate 103 only about the pitch rotation axis P. Consequently, the correction lens 101 is rotatable about the pitch rotation axis P and the yaw rotation axis Y passing through the rotation center point O while being restricted in rotation about the optical axis. In other words, in the present embodiment, the movable unit is movable only in a direction required for image shake correction. Thus, even when the movable unit suffers impact or the like from an external force, the position of the correction lens 101 can be precisely detected, so that image shake correction can be realized with high accuracy.

Advantageous for thinning the image shake correcting device (the thickness thereof in the optical axis direction).

In the present embodiment, a plurality of first rolling balls 105 is positioned such that the center points thereof are located on the first hypothetical spherical surface S1 and a plurality of second rolling balls 106 is positioned such that the center points thereof are located on the second hypothetical spherical surface S2. Thus, even when the movable unit 102 rotates about the yaw rotation axis Y or rotates about the pitch rotation axis P, the first rolling ball 105 is always located on the first hypothetical spherical surface S1. Likewise, the second rolling ball 106 is always located on the second hypothetical spherical surface S2.

Also, both the front surface and the back surface of the rotation preventing plate 103 are in a spherical shape having the rotation center point O as a center axis, and the rotation preventing plate 103 is located between the first hypothetical spherical surface S1 and the second hypothetical spherical surface S2. Thus, the positional relationship between the rotation preventing plate 103 and the first and second rolling balls, i.e., the positional relationship between the rotation preventing plate 103 and the first and second rolling balls in the radial direction from the rotation center point O does not change regardless of the position of the movable unit 102.

Thus, even when the rotation preventing plate 103 is thinned to a minimum thickness to ensure the required strength, the ball receivers for holding the first and second rolling balls can always be formed on the rotation preventing plate 103. Consequently, the thickness of the entire device in the optical axis direction may be thinned.

Note that the front surface and the back surface of the rotation preventing plate 103 may also be in a polyhedral shape which is an approximation to a spherical surface. In short, the rotation preventing plate 103 may be in any polyhedral shape as long as it can be located between the first hypothetical spherical surface S1 and the second hypothetical spherical surface S2. When interference between the rotation preventing plate 103 and its peripheral components can be avoided, the rotation preventing plate 103 may also be provided with a projection which protrudes between the first and second hypothetical spherical surfaces for the purpose of improvement in strength and position detection.

In the present embodiment, the center points of all of the first rolling balls 105 are positioned on the first hypothetical spherical surface S1 and the center points of all of the second rolling balls 106 are positioned on the second hypothetical spherical surface S2. The present invention is not limited thereto but the rolling balls may also be positioned offset from each other in order to provide a flange for reinforcing the rotation preventing plate 103 or to avoid interference between the rotation preventing plate 103 and other components external to the image shake correcting device. In this case, the first rolling balls 105 are positioned so as to intersect with the first hypothetical spherical surface S1 and the second rolling balls 106 are positioned so as to intersect with the second hypothetical spherical surface S2. In other words, the difference in distances from the center points of the rolling balls to the rotation center point O is set to be smaller than the diameter of each rolling ball. In this arrangement, the amount of increase in the thickness of the rotation preventing plate 103 is suppressed to be equal to or less than the diameter of the rolling ball, the thickness of the entire device in the optical axis direction can be avoided from being increased.

The thickness of the rotation preventing plate 103 can be uniformized.

In the present embodiment, the shapes of portions in which the first to third rolling balls are positioned and the rotation preventing plate 103 are assumed to be concentric spherical surfaces. Thus, the rotation preventing plate 103 can be formed into a shape having a uniform thickness. In this manner, the rotation preventing plate 103 can be manufactured by a processing method having excellent productivity, such as pressing or the like.

The size of the rotation preventing plate 103 (projection area into the optical axis direction) can be reduced.

In the present embodiment, among three rolling balls for supporting the movable unit 102, two rolling balls (the first rolling balls 105) ride on the rotation preventing plate 103, and the remaining one rolling ball (the third rolling ball 107) rides on the fixed base plate 104. Thus, the area of the rotation preventing plate 103 as viewed from the optical axis direction can be reduced as compared with the configuration in which all the rolling balls ride on the rotation preventing plate 103. In this manner, the entire device can be made smaller in size.

As described above, according to the present embodiment, an image shake correcting device that is capable of moving a movable member in the yaw direction and the pitch direction while suppressing rotation of the movable member about the optical axis may be provided.

Second Embodiment

Next, a description will be given of a second embodiment of the present invention with reference to FIGS. 8 to 12. The same components as those in the first embodiment are designated by the already used reference numerals, and thus, a detail description thereof will be omitted. A description will be mainly given of the differences from the first embodiment.

Figure 8:
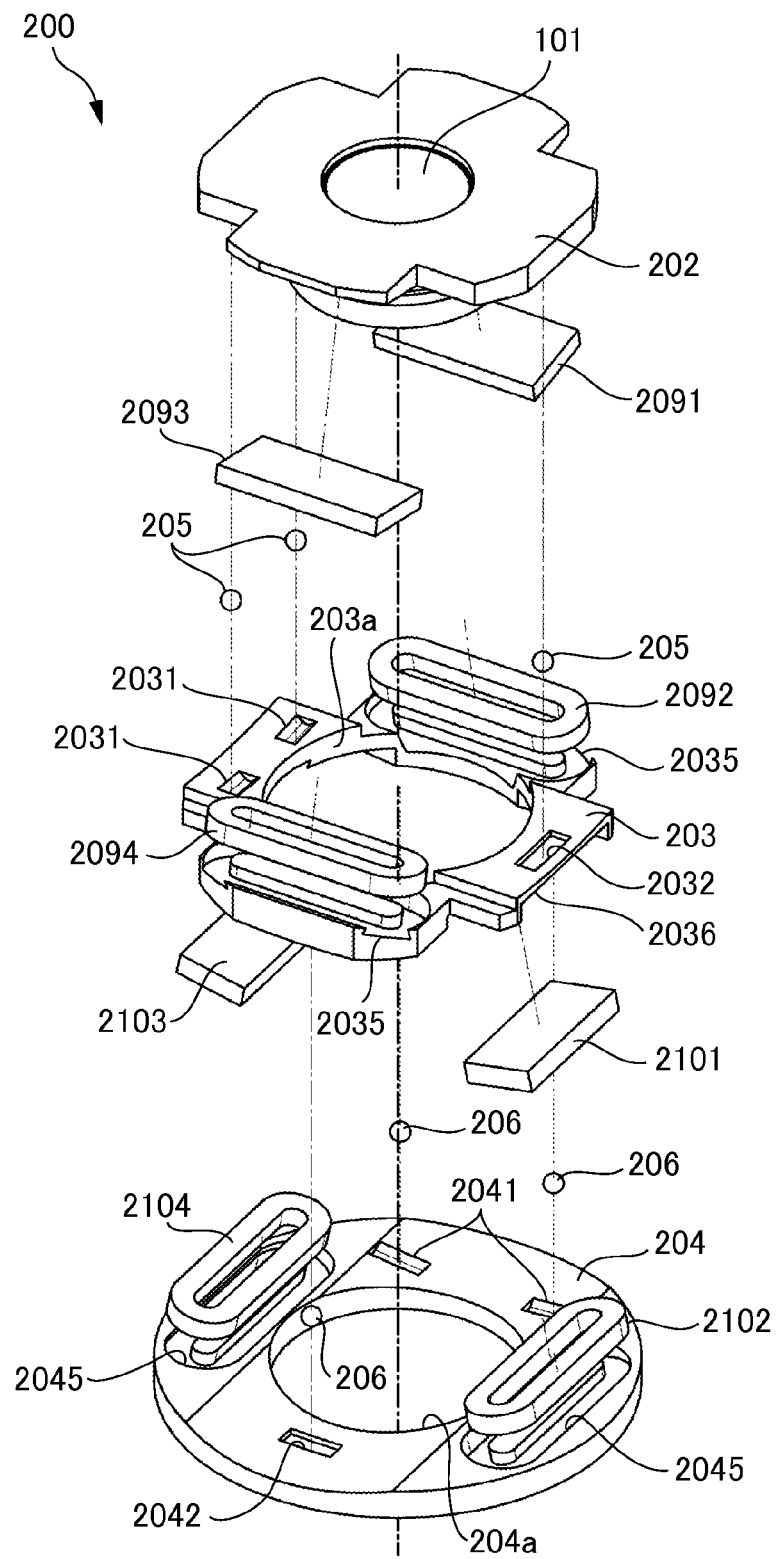
FIG. 8 is an exploded perspective view illustrating an image shake correcting device according to a second embodiment of the present invention.

FIG. 8 is an exploded perspective view illustrating components of an image shake correcting device 200. The image shake correcting device 200 includes a movable unit 202 for holding the correction lens 101, a rotation preventing plate 203, and a fixed base plate 204. The image shake correcting device 200 includes three first rolling balls 205 and three second rolling balls 206 as rolling members. The image shake correcting device 200 further includes an urging spring 108 and an electromagnetic drive unit, but the urging spring 108 is not shown in FIG. 8. The electromagnetic drive unit has a first drive unit 209 and a second drive unit 210.

Figure 9:
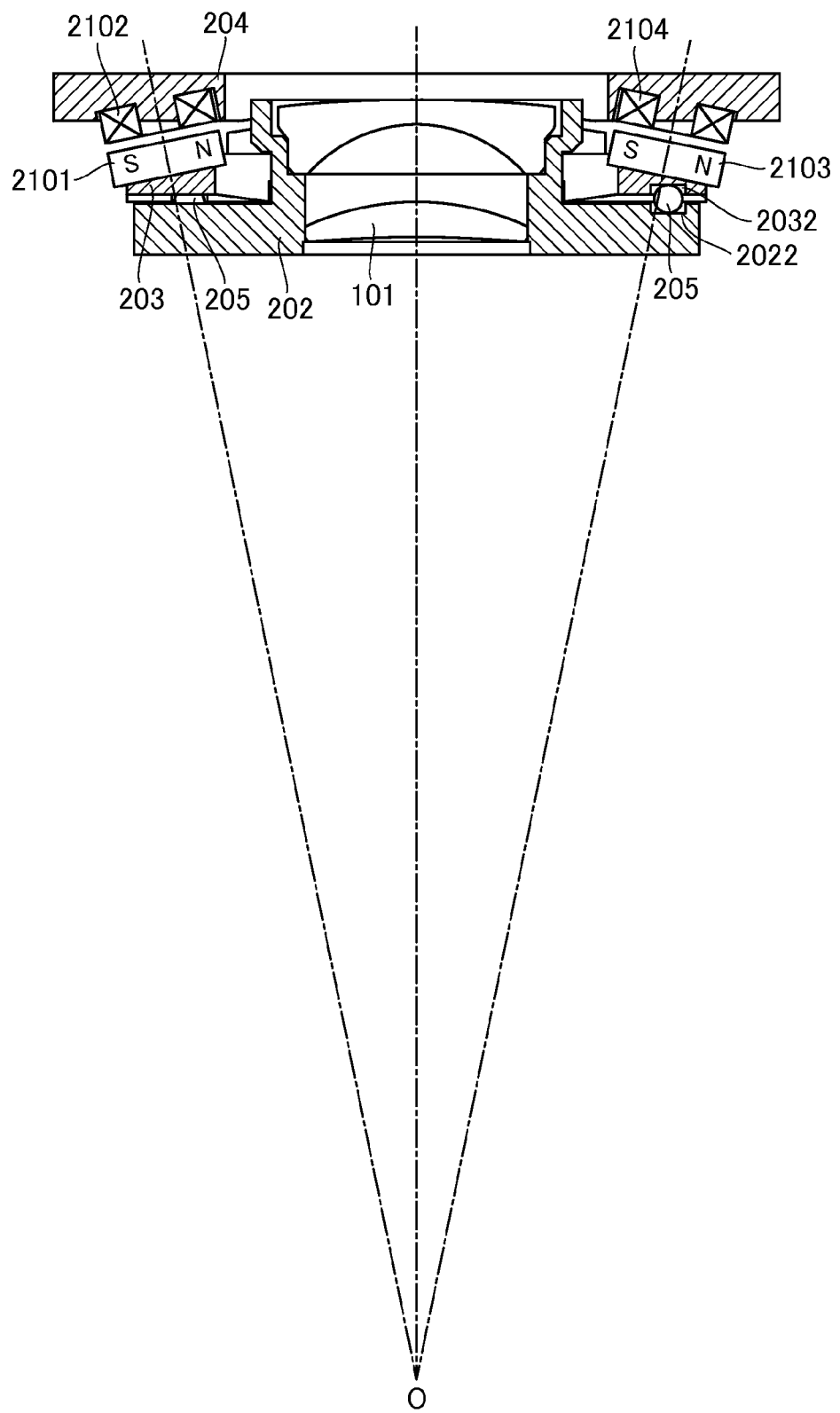
FIG. 9 is a cross-sectional view illustrating the image shake correcting device shown in FIG. 8 when cut along a plane which passes through the optical axis and is orthogonal to the pitch rotation axis.
Figure 10:
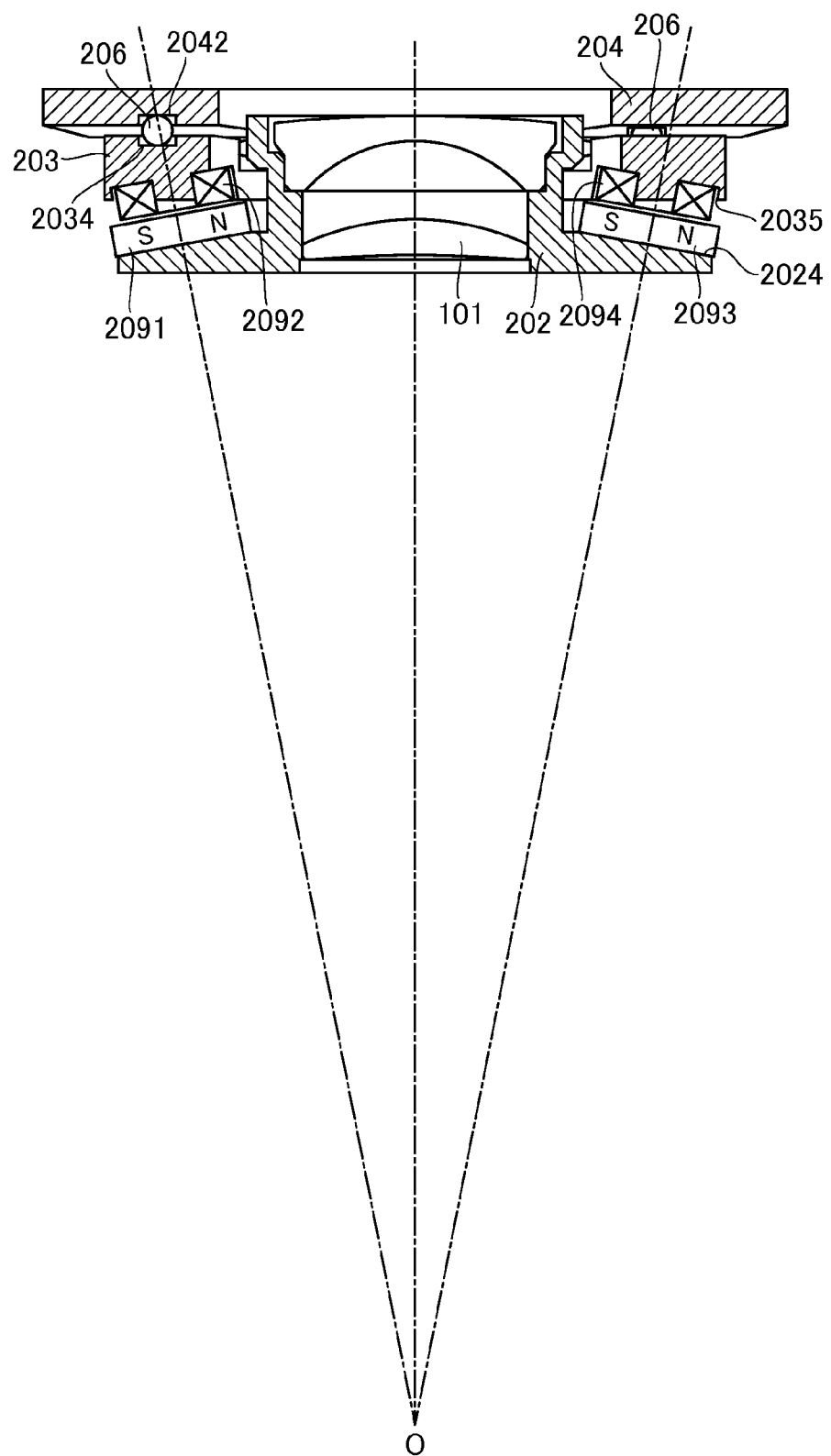
FIG. 10 is a cross-sectional view illustrating the image shake correcting device shown in FIG. 9 when cut along a plane which passes through the optical axis and is orthogonal to the yaw rotation axis.
Figure 11:
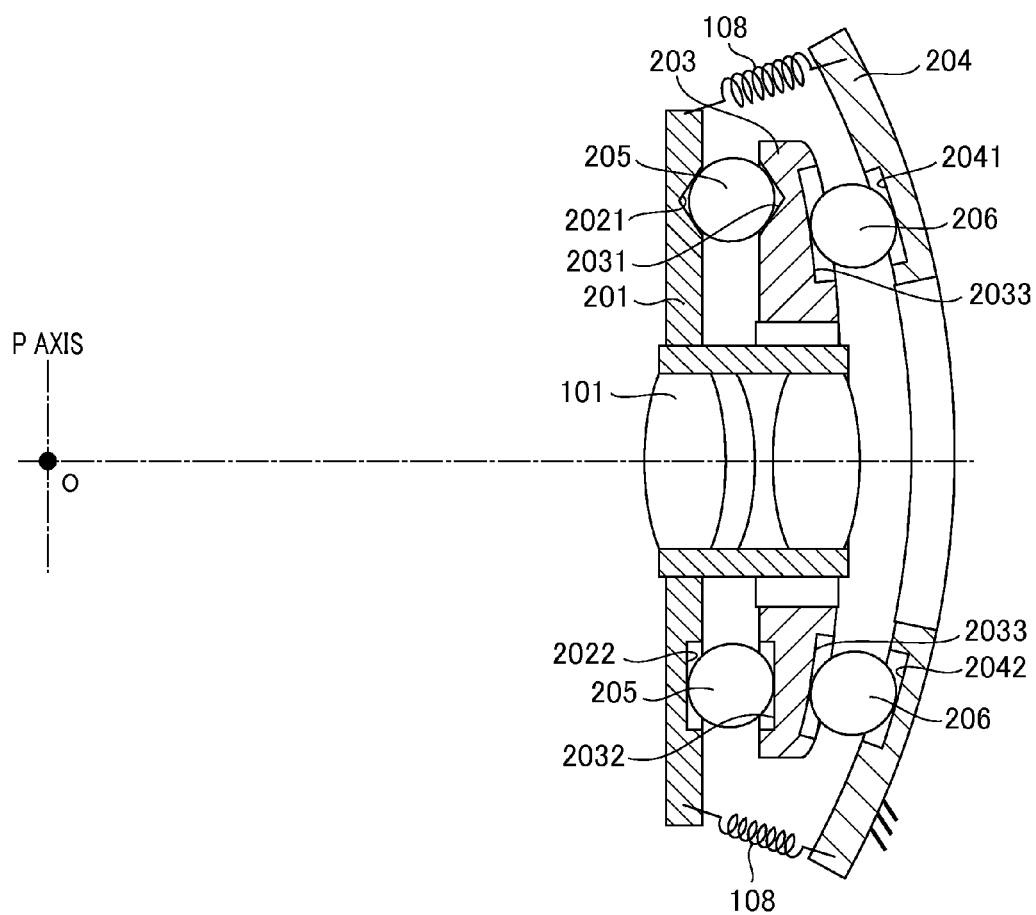
FIG. 11 is a schematic view illustrating a cross-sectional structure which passes through the optical axis and is orthogonal to the yaw rotation axis.
Figure 12:
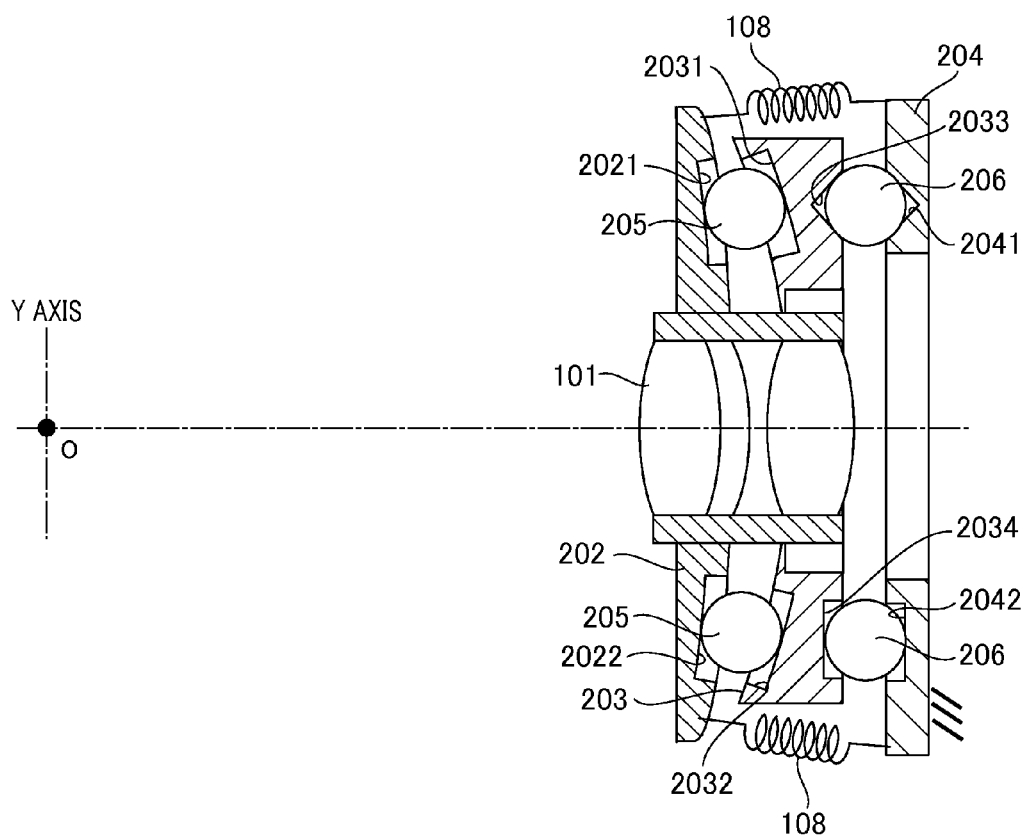
FIG. 12 is a schematic view illustrating a cross-sectional structure which passes through the optical axis and is orthogonal to the pitch rotation axis.

FIG. 9 is a cross-sectional view illustrating the image shake correcting device 200 when cut along a plane which is parallel to the optical axis and is orthogonal to the pitch rotation axis P. FIG. 10 is a cross-sectional view illustrating the image shake correcting device 200 when cut along a plane which is parallel to the optical axis and is orthogonal to the yaw rotation axis Y. FIG. 11 is a schematic view illustrating the structure of the image shake correcting device 200 in the same cross section as that shown in FIG. 9. FIG. 12 is a schematic view illustrating the structure of the image shake correcting device 200 in the same cross section as that shown in FIG. 10. In FIGS. 11 and 12, the electromagnetic drive unit is omitted for ease of explanation and the positions of the first and second rolling balls are appropriately changed such that the center points thereof are located on the cross section. In FIGS. 11 and 12, a part of the shape of the image shake correcting device 200 is exaggeratedly shown.

The movable unit 202 holds the correction lens 101 at the central opening. As shown in FIG. 11, the movable unit 202 includes two V-shaped first ball receivers 2021 and one plane first ball receiver 2022 on the side that faces the rotation preventing plate 203. The V-shaped first ball receiver 2021 has a groove of which the cross-sectional shape is a V-shape. The shape of the groove is defined by two rotary surfaces having the pitch rotation axis P as a center axis. The V-shaped first ball receiver 2021 is brought into contact with the first rolling ball 205 at two points. In the present embodiment, the shape of the groove is defined as two conical surfaces having the pitch rotation axis P as a center axis, but may also be defined as a spherical surface having two different center points on the pitch rotation axis P or as a torus surface. The plane first ball receiver 2022 is formed into a cylindrical surface having a center axis which is coincident with an axis passing through the rotation center point O and is brought into contact with the first rolling ball 205 at a single point. The movable unit 202 has two magnet holders 2024 (see FIG. 10) which are disposed at positions toward the outer peripheral edge of the movable unit 202 and hold first and second magnets to be described below.

The rotation preventing plate 203 has a central opening 203a so as not to prevent the optical path of the correction lens 101. As shown in FIGS. 9 to 12, the shape of the front surface side (the side directed toward the rotation center point O) of the rotation preventing plate 203 is a part of the cylindrical surface having the pitch rotation axis P as a center axis, and the shape of the back surface side thereof is a part of the cylindrical surface having the yaw rotation axis Y as a center axis. The rotation preventing plate 203 has two V-shaped first ball receivers 2031, one plane first ball receiver 2032, and two coil holders 2035 on the front surface thereof. The rotation preventing plate 203 also has two V-shaped second ball receivers 2033, one plane second ball receiver 2034, and two magnet holders 2036 on the back surface thereof.

The V-shaped first ball receiver 2031 has a groove of which the cross-sectional shape is a V-shape. The shape of the groove is defined by the rotary surface having the pitch rotation axis P as a center axis. In the present embodiment, the shape of the groove is defined as two conical surfaces having the pitch rotation axis P as a center axis. The V-shaped first ball receiver 2031 is positioned opposite to the V-shaped first ball receiver 2021 of the movable unit 202 and is brought into contact with the first rolling ball 205 at two points. The plane first ball receiver 2032 is formed into a cylindrical surface having a center axis which is coincident with an axis passing through the rotation center point O. The plane first ball receiver 2032 is positioned opposite to the plane first ball receiver 2022 of the movable unit 202 and is brought into contact with the first rolling ball 205 at a single point.

The V-shaped second ball receiver 2033 has a groove of which the cross-sectional shape is a V-shape. The shape of the groove is defined by the rotary surface having the yaw rotation axis Y as a center axis. In the present embodiment, the shape of the groove is defined as two conical surfaces having the yaw rotation axis Y as a center axis. The V-shaped second ball receiver 2033 is brought into contact with the second rolling ball 206 at two points. The plane second ball receiver 2034 has a groove of which the bottom surface is a cylindrical surface having the yaw rotation axis Y as a center axis and is brought into contact with the second rolling ball 206 at a single point.

A plurality of coil holders 2035 hold a first coil 2092 and a second coil 2094 to be described below. The coil holders 2035 are respectively positioned to face the magnet holders 2024 disposed on the movable unit 202. A plurality of magnet holders 2036 hold a third magnet 2101 and a fourth magnet 2103.

The fixed base plate 204 has a substantial disk shape and is fixed to a lens barrel for supporting another lens group (not shown). A central opening 204a disposed on the fixed base plate 204 is used as the optical path of the correction lens 101. The front surface side of the fixed base plate 204 is formed into a cylindrical surface having a center axis which is coincident with the yaw rotation axis Y.

The fixed base plate 204 has two V-shaped second ball receivers 2041, one plane second ball receiver 2042, and two coil holders 2045. The V-shaped second ball receiver 2041 has a groove of which the cross-sectional shape is a V-shape. The shape of the groove is defined by two rotary surfaces having the yaw rotation axis Y as a center axis. In the present embodiment, the shape of the groove is defined as two conical surfaces having the yaw rotation axis Y as a center axis. The V-shaped second ball receiver 2041 is positioned opposite to the V-shaped second ball receiver 2033 of the rotation preventing plate 203 and is brought into contact with the second rolling ball 206 at two points. The plane second ball receiver 2042 has a groove of which the bottom surface is a cylindrical surface having the yaw rotation axis Y as a center axis. The plane second ball receiver 2042 is positioned opposite to the plane second ball receiver 2034 of the rotation preventing plate 203 and is brought into contact with the second rolling ball 206 at a single point. The fixed base plate 204 has two coil holders 2045 which are disposed at positions toward the outer peripheral edge of the fixed base plate 204. The coil holders 2045 hold a third coil 2102 and a fourth coil 2104.

The shape of each of the first rolling ball 205 and the second rolling ball 206 is sphere. These rolling balls are made of a material having high hardness, such as stainless steel, ceramic material, or the like, in order to reduce a rolling resistance and to produce them with a high processing accuracy. The number of the first rolling balls 205 is three and the center point of each ball is located on the cylindrical surface having the pitch rotation axis P as a center axis. The number of the second rolling balls 206 is three and the center point of each ball is located on the cylindrical surface having the yaw rotation axis Y as a center axis.

The first drive unit 209 is a voice coil motor. The first drive unit 209 has a first magnet 2091, a first coil 2092, a second magnet 2093, and a second coil 2094. In the present embodiment, two voice coil motors are positioned with the optical path therebetween for the improvement of the driving force. Since the first coil 2092 is electrically connected to the second coil 2094, the driving forces generated by the first coil 2092 and the second coil 2094 act in the same direction when the driving control unit energizes the coils. In the present embodiment, the first coil 2092 and the second coil 2094 are positioned on the rotation preventing plate 203. In this manner, the pitch directional driving force can be exerted between the rotation preventing plate 203 and the movable unit 102.

The second drive unit 110 is a voice coil motor. The second drive unit 210 has the third magnet 2101, the third coil 2102, the fourth magnet 2103, and the fourth coil 2104. The second drive unit 110 is the same configuration as that of the first drive unit 209, and thus, a detailed description thereof will be omitted. When the driving control unit energizes the third coil 2102 and the fourth coil 2104, the Lorentz force is generated in a direction orthogonal to the magnetizing direction and the conducting direction of the third magnet 2101 and the fourth magnet 2103. In this manner, the yaw directional driving force is exerted between the fixed base plate 104 and the rotation preventing plate 203.

Next, a description will be given of the operation of the image shake correcting device 200. The rotation preventing plate 203 is movable with respect to the fixed base plate 204 only in the yaw direction. The movable unit 202 is movable with respect to the rotation preventing plate 203 only in the pitch direction. When the driving control unit energizes the first coil 2092 and the second coil 2094 so as to pass a predetermined current therethrough, a pitch directional driving force is generated between the rotation preventing plate 203 and the movable unit 102 due to the action of the first drive unit 209. Consequently, the movable unit 202 for holding the correction lens 101 moves in the rotational direction having the pitch rotation axis P as a center axis. On the other hand, when the driving control unit energizes the third coil 2102 and the fourth coil 2104 so as to pass a predetermined current therethrough, a yaw directional driving force is generated between the fixed base plate 104 and the rotation preventing plate 203 due to the action of the second drive unit 210. Consequently, the movable unit 202, the first rolling ball 205, and the rotation preventing plate 203 move in the yaw direction. These two movements are combined, so that the center point of the correction lens 101 can be moved at any position on the spherical surface of which the spherical center is coincident with the rotation center point O.

The effects obtained by the image shake correcting device 200 of the present embodiment are as follows:

Rotation of the movable member about the optical axis is suppressed.

The rotation preventing plate 203 is rotatable with respect to the fixed base plate 204 only about the yaw rotation axis Y. The movable unit 202 is rotatable with respect to the rotation preventing plate 203 only about the pitch rotation axis P. Consequently, the correction lens 101 is rotatable about the pitch rotation axis P and the yaw rotation axis Y passing through the rotation center point O while being restricted in rotation about the optical axis. In other words, the correction member is movable only in a direction required for image shake correction.

Ease of manufacturing.

In the present embodiment, the front surface side of the rotation preventing plate 203 is a part of the cylindrical surface having the pitch rotation axis P as a center axis, and the back surface side thereof is a part of the cylindrical surface having the yaw rotation axis Y as a center axis. Also, the front surface side of the fixed base plate 204 is a part of the cylindrical surface having the yaw rotation axis Y as a center axis. Thus, the components of the image shake correcting device 200 are arranged in a cylindrical shape instead of a spherical shape. In general, a cylindrical surface is more readily processed or measured than a spherical surface, and thus, the rotation preventing plate 203 may be more readily manufactured than the rotation preventing plate 103 of the first embodiment.

On the other hand, a portion for holding the first and second rolling balls is formed on the rotation preventing plate 103 of the first embodiment, and thus, the thickness of the rotation preventing plate 103 of the first embodiment may be uniformized or thinned as compared with the rotation preventing plate 203 of the second embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-140730, filed on Jul. 4, 2013, which is hereby incorporated by reference herein in its entirety.

What is claimed is:

1. An image shake correcting device that corrects image shake by moving a movable member holding a correction member by a drive unit, the image shake correcting device comprising:
   a first support member configured to rotatably support the movable member with respect to a first rotation axis orthogonal to the optical axis of the correction member; and
   a second support member configured to rotatably support the first support member with respect to a second rotation axis which is orthogonal to the optical axis of the correction member and intersects the first rotation axis at a point on the optical axis,
   wherein the first support member prevents the movable member from rotating in the optical axis circumference, and
   wherein the second support member prevents the first support member from rotating in the optical axis circumference.

2. The image shake correcting device according to claim 1, further comprising:
   a first rolling member configured to support the movable member with respect to the first support member;
   a second rolling member configured to support the first support member with respect to the second support member; and
   an urging member configured to urge the movable member and the first support member in a direction where both the movable member and the second support member are brought closer to each other,
   wherein each of the movable member and the first support member has a receiver of which a contact surface between the first rolling member and each of the movable member and the first support member is in the form of a rotary surface which is formed with respect to the first rotation axis, and each of the first support member and the second support member has a receiver of which a contact surface between the second rolling member and each of the first support member and the second support member is in the form of a rotary surface which is formed with respect to the second rotation axis.

3. The image shake correcting device according to claim 2, wherein the receiver of each of the movable member and the first support member has a plurality of contact surfaces, with which the plurality of first rolling members is brought into contact, having a rotary surface which is formed with respect to the first rotation axis, and the receiver of each of the first support member and the second support member has a plurality of contact surfaces, with which the plurality of second rolling members is brought into contact, having a rotary surface which is formed with respect to the second rotation axis.

4. The image shake correcting device according to claim 2, further comprising:
   a third rolling member configured to support the movable member with respect to the second support member,
   wherein the movable member has a receiver of which the contact surface between the movable member and the third rolling member is in the form of a spherical surface formed with respect to a point on the optical axis, and the second support member has a receiver of which the contact surface between the second support member and the third rolling member is in the form of a spherical surface formed with respect to a point on the optical axis.

5. The image shake correcting device according to claim 2, wherein the first rolling member and the second rolling member have a plurality of balls, opposite surfaces of the movable member and the first support member are constructed in the form of a spherical surface which is formed with respect to a point on the optical axis, and opposite surfaces of the first support member and the second support member are constructed in the form of a spherical surface which is formed with respect to a point on the optical axis.

6. The image shake correcting device according to claim 5, wherein the first rolling member is located at a position where the first rolling member and a first hypothetical spherical surface formed with respect to a point on the optical axis intersect, the second rolling member is located at a position where the second rolling member and a second hypothetical spherical surface formed with respect to a point on the optical axis intersect, and the first support member is located between the first hypothetical spherical surface and the second hypothetical spherical surface.

7. The image shake correcting device according to claim 2, wherein the first rolling member and the second rolling member have a plurality of balls, the first rolling member is located on a cylindrical surface which is formed with respect to the first rotation axis, and the second rolling member is located on a cylindrical surface which is formed with respect to the second rotation axis.

8. The image shake correcting device according to claim 7, wherein the drive unit comprises a first drive unit that drives the movable member with respect to the first support member and a second drive unit that drives the first support member with respect to the second support member.

9. The image shake correcting device according to claim 1, wherein the drive unit comprises a first drive unit and a second drive unit that drive the movable member with respect to the second support member in different directions.

10. A lens barrel comprising:
    the image shake correcting device according to claim 1.

11. An image pickup apparatus comprising:
the lens barrel according to claim 10.

12. An optical apparatus comprising:
the image shake correcting device according to claim 1.

13. An image shake correcting device that corrects image shake by moving a movable member holding a correction member by a drive unit, the image shake correcting device comprising:
   a first support member configured to rotatably support the movable member with respect to a first rotation axis orthogonal to the optical axis of the correction member; and
   a second support member configured to rotatably support the first support member with respect to a second rotation axis which is orthogonal to the optical axis of the correction member and intersects the first rotation axis at a point on the optical axis.

14. The image shake correcting device according to claim 13, wherein the first support member prevents the movable member from rotating in the optical axis circumference.

15. A lens barrel comprising:
the image shake correcting device according to claim 13.

16. An optical apparatus comprising:
the image shake correcting device according to claim 13.

17. An image pickup apparatus comprising:
the lens barrel according to claim 15.

* * * * *